United States Patent
Yoo

(10) Patent No.: US 12,288,035 B2
(45) Date of Patent: Apr. 29, 2025

(54) QUESTION ANSWERING WITH FIRST AND SECOND ARTIFICIAL INTELLIGENCE MODELS BASED ON DOCUMENT WITH UPDATED QUESTION

(71) Applicant: Persona AI Co., Ltd., Seoul (KR)

(72) Inventor: Seungjae Yoo, Hanam-si (KR)

(73) Assignee: Persona AI Co., Ltd., Seoul (KR)

( * ) Notice: Subject to any disclaimer, the term of this patent is extended or adjusted under 35 U.S.C. 154(b) by 0 days.

(21) Appl. No.: 18/656,714

(22) Filed: May 7, 2024

(65) Prior Publication Data

US 2024/0386210 A1 Nov. 21, 2024

(30) Foreign Application Priority Data

May 15, 2023 (KR) .................. 10-2023-0062471
Jun. 27, 2023 (KR) .................. 10-2023-0082455

(51) Int. Cl.
*G06F 40/30* (2020.01)
*G06F 16/35* (2019.01)
*G06N 3/045* (2023.01)
*H04L 51/02* (2022.01)

(52) U.S. Cl.
CPC .............. *G06F 40/30* (2020.01); *G06F 16/35* (2019.01); *H04L 51/02* (2013.01)

(58) Field of Classification Search
CPC .......... G06F 16/2425; G06F 16/3325; G06F 40/279; G06F 40/30; G06N 3/04; G06N 3/045
USPC ....... 704/1, 9; 706/12, 27, 50; 707/759, 764, 707/783
See application file for complete search history.

(56) References Cited

U.S. PATENT DOCUMENTS

| | | | |
|---|---|---|---|
| 5,953,718 A * | 9/1999 | Wical | G06F 16/313 |
| 2015/0379010 A1* | 12/2015 | Allen | G06F 16/3338 |
| | | | 707/731 |
| 2018/0341871 A1* | 11/2018 | Maitra | G06N 3/045 |
| 2019/0228099 A1* | 7/2019 | Bajaj | G06N 3/044 |
| 2020/0050942 A1* | 2/2020 | Sun | G06F 40/30 |
| 2020/0111025 A1* | 4/2020 | Han | G06N 5/04 |
| 2020/0134449 A1* | 4/2020 | Perez | G06F 40/205 |
| 2020/0167427 A1* | 5/2020 | Filoti | G06F 16/3325 |

(Continued)

FOREIGN PATENT DOCUMENTS

| | | |
|---|---|---|
| KR | 10-2019-0055425 A | 5/2019 |
| KR | 10-2021-0051519 A | 5/2021 |

(Continued)

OTHER PUBLICATIONS

Korean Notice of Allowance issued on Oct. 30, 2023 in corresponding Korean Application No. 10-2023-0082455 (3 pages in Korean and 2 pages in English).

(Continued)

*Primary Examiner* — Martin Lerner
(74) *Attorney, Agent, or Firm* — NSIP Law

(57) ABSTRACT

The present disclosure provides an electronic apparatus, which conducts learning based on sensitive information or specialized tasks for the self-stored artificial intelligence model, while using an artificial intelligence model stored in an external electronic device, and uses internal and external artificial intelligence models complementarily to each other through this to provide appropriate answers and task results.

8 Claims, 7 Drawing Sheets

(56) References Cited

U.S. PATENT DOCUMENTS

| | | | |
|---|---|---|---|
| 2021/0133234 A1 | 5/2021 | Bedadala et al. | |
| 2021/0295172 A1* | 9/2021 | Sultan | G06N 3/047 |
| 2022/0067486 A1* | 3/2022 | Klein | G06F 40/40 |
| 2022/0084510 A1 | 3/2022 | Peng et al. | |
| 2022/0121820 A1* | 4/2022 | Chopra | G06N 3/084 |
| 2022/0141160 A1* | 5/2022 | Ham | G06F 16/35 |
| | | | 709/206 |
| 2022/0327287 A1* | 10/2022 | Agrawal | G06F 40/30 |
| 2023/0169276 A1* | 6/2023 | Cook | G06F 40/30 |
| | | | 706/11 |
| 2024/0104308 A1* | 3/2024 | Francis | G06F 40/279 |
| 2024/0249162 A1* | 7/2024 | Paiuk | G06N 5/04 |

FOREIGN PATENT DOCUMENTS

| | | |
|---|---|---|
| KR | 10-2022-0046964 A | 4/2022 |
| KR | 10-2436549 B1 | 8/2022 |
| KR | 10-2023-0052387 A | 4/2023 |
| KR | 10-2604242 B1 | 11/2023 |

OTHER PUBLICATIONS

Korean Office Action issued on Jul. 11, 2023 in corresponding Korean Application No. 10-2023-0082455 (5 pages in Korean and 3 pages in English).

Hong, Taesuk, et al. "Knowledge-grounded dialogue modelling with dialogue-state tracking, domain tracking, and entity extraction." *Computer Speech & Language* 78 (2023): 101460.

\* cited by examiner

FIG. 5A

QUESTION ANSWERING WITH FIRST AND SECOND ARTIFICIAL INTELLIGENCE MODELS BASED ON DOCUMENT WITH UPDATED QUESTION

CROSS-REFERENCE TO RELATED APPLICATIONS

This application claims the benefit under 35 USC 119 (a) of Korean Patent Application Nos. 10-2023-0062471 filed on May 15, 2023 and 10-2023-0082455 filed on Jun. 27, 2023, in the Korean Intellectual Property Office, the disclosure of which is incorporated herein by reference in its entirety.

TECHNICAL FIELD

The present disclosure relates to an electronic apparatus, and more particularly, to an electronic apparatus providing various tasks and functions by using both a chatbot provided therein and an external chatbot.

BACKGROUND

In recent years, various Generative AIs, led by Chat-GPT, have been developed and provided. In particular, artificial intelligence models such as chatbots that provide various information or perform tasks in the form of a conversation with a user have a great advantage in that the artificial intelligence models enable direct communication with the user.

However, since most artificial intelligence models such as existing chatbots are trained based on a large database and then commonly used for a large number of users, it was unfortunate that it was difficult to specialize in personal information or task.

Conversely, when training the artificial intelligence model based only on information/data held by an individual, there is a problem that it is difficult to significantly improve the problem-solving ability of the artificial intelligence model in a universal direction, and the scope of information covered is too narrow.

SUMMARY

The present disclosure provides an electronic apparatus which conducts learning based on sensitive information or specialized tasks for the self-stored artificial intelligence model while using an artificial intelligence model stored in an external electronic device, and uses internal and external artificial intelligence models complementarily to each other through this to provide appropriate answers and task results.

In particular, the present disclosure provides an electronic apparatus that is not vulnerable in terms of security while providing answers/tasks that are very suitable for the individual user or the organization/institution to which the user belongs by using the internal and external artificial intelligence models.

The objects of the present disclosure not limited to the above-mentioned objects, and other objects and advantages of the present disclosure that are not mentioned can be understood by the following description, and will be more clearly understood by embodiments of the present disclosure. Further, it will be readily appreciated that the objects and advantages of the present disclosure can be realized by means and combinations shown in the claims.

In an aspect, provided is an electronic apparatus which includes: a memory including a first artificial intelligence model for performing questioning and answering; a communication unit for performing communication with an external electronic apparatus including a second artificial intelligence model for performing questioning and answering; and a processor providing an answer to a question of a user through at least one of the first artificial intelligence model and the second artificial intelligence model. The processor obtains, when a question of the user for at least one document is obtained, an answer of the first artificial intelligence model to the question, updates the question based on the answer of the first artificial intelligence model, and obtains an answer of the second artificial intelligence model based on the updated question.

The processor may classify a category of the document based on semantic analysis of the first artificial intelligence model for the document, and store the document in a knowledge base linked with the electronic apparatus based on the classified category.

The processor may obtain the answer of the first artificial intelligence model to the question of the user based on at least one target document included in the same category as the document in the knowledge base.

Further, the processor may also identify at least one keyword included in the question of the user, identify a plurality of documents included in the same category as the document in the knowledge base, select at least one target document related to the keyword among the plurality of documents, and obtain the answer of the first artificial intelligence model to the question of the user based on the selected target document.

Meanwhile, the processor may replace personal information included in at least one of the question of the user and the answer of the first artificial intelligence model with example information in a process of updating the question.

Further, the processor may identify, when a security level of a predetermined degree or more is set in at least one of a first document related to the question and a second document related to the answer of the first artificial intelligence model, security information included in the answer of the first artificial intelligence model, and replace the security information included in at least one of the question of the user and the first artificial intelligence model in the process of updating the question.

The artificial intelligence model may include at least one of an engine including a recurrent neural network (RNN) model, a natural language generation engine, a natural language processing engine, a natural language understanding engine, and a conversation engine. In addition, the processor may train at least one engine constituting the artificial intelligence model based on the document.

The processor may identify at least one task requested according to the question of the user, obtain the answer of the first artificial intelligence model to the question when the identified task is included in a predetermined first task, update the question based on the answer of the first artificial intelligence model, and obtain and provide the answer based on the updated question, and obtains and provides the answer of the first artificial intelligence model to the question when the identified task is included in a predetermined second task.

Here, when a user input for requesting an additional answer is received after the answer of the first artificial intelligence model is provided as a first answer as a result that the identified task is included in the second task, the processor may update the question based on the answer of the first artificial intelligence model, and obtain the answer of the second artificial intelligence model based on the updated question and provide the obtained answer as a second answer. In addition, the processor may identify whether additional information included in the second answer, but not included in the first answer, exists when the second answer is provided, update the first task and the second task so that the identified task is included in the first task other than the second task when the additional information exists, and train the first artificial intelligence model based on the second answer when the additional information does not exist.

In another aspect, provided is a control method of an electronic apparatus including a first artificial intelligence model for performing questioning and answering, which includes: obtaining, by the electronic apparatus, when a question of the user for at least one document is obtained, an answer of the first artificial intelligence model to the question; updating, by the electronic apparatus, the question based on the answer of the first artificial intelligence model; and obtaining an answer of a second artificial intelligence model stored in an external electronic apparatus and performing the questioning and answering based on the updated question.

An electronic apparatus and a control method according to the present disclosure can provide an answer specialized to a personal document or a security document for use, and at the same time, provide an answer/task of a universal and useful range by selectively utilizing an internal artificial intelligence model and an external artificial intelligence model.

BRIEF DESCRIPTION OF THE DRAWINGS

FIGS. 5A and 5B are diagrams showing a state in which the electronic apparatus receives a document jointly with a question of a user and provides one or more answers for the question.

DETAILED DESCRIPTION

Figure 1A:
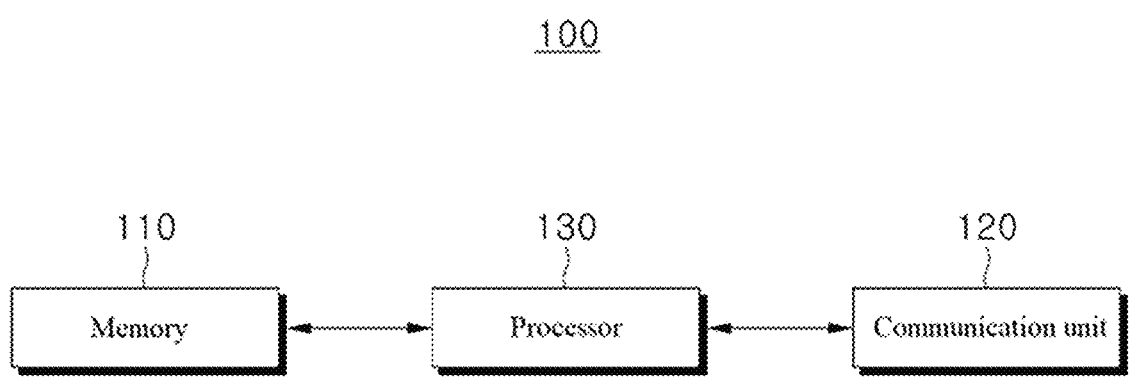
FIG. 1A is a block diagram describing a configuration of an electronic apparatus according to an embodiment of the present disclosure.

Before explaining the present disclosure in detail, the description method of this specification and drawings will be explained.

First, the terms used in this specification and claims are general terms selected in consideration of their functions in various embodiments of the present disclosure. However, these terms may vary depending on the intention of technicians working in the relevant technical field, legal or technical interpretation, and the emergence of new technologies. Additionally, some terms are also arbitrarily selected by the applicant. The terms may be interpreted as defined in this specification, and if there is no specific term definition, they may be interpreted based on the overall content of this specification and common technical knowledge in the relevant technical field.

Further, the same reference numerals or symbols in each drawing attached to this specification indicate parts or components that perform substantially the same function. For convenience of explanation and understanding, the same reference numerals or symbols are also used in different embodiments. That is, even if all components having the same reference numerals are shown in multiple drawings, the multiple drawings do not represent one embodiment.

In addition, in this specification and claims, terms including ordinal numbers such as "first", "second", etc. may be used to distinguish between components. The ordinal numbers are used to distinguish identical or similar components from each other, and the meaning of the term should not be interpreted limitedly due to the use of the ordinal numbers. As an example, the order of use or arrangement of components combined with the ordinal numbers should not be limited by the number. If necessary, the respective ordinal numbers may be used interchangeably.

In this specification, a singular form includes a plural form if there is no clearly opposite meaning in the context. In the present application, it should be understood that term "include" or "is/are constituted by" indicates that a feature, a number, a step, an operation, a component, a part or the combination thereof described in the specification is present, but does not exclude a possibility of presence or addition of one or more other features, numbers, steps, operations, components, parts or combinations thereof, in advance.

In embodiments of the present disclosure, terms such as "module", "unit", "part", etc. are terms to refer to a component that performs at least one function or operation, and such component may be implemented as hardware or software, or implemented by a combination of hardware and software. In addition, a plurality of "modules", "units", "parts", etc. may be integrated into and implemented as at least one module or chip, except in cases where each needs to be implemented as individual specific hardware.

In addition, in the embodiments of the present disclosure, when a part is connected to another part, this includes not only direct connection but also indirect connection through other media. In addition, the meaning that a part includes a certain component does not mean that other components are excluded, but that it may further include other components, unless specifically stated to the contrary.

FIG. 1A is a block diagram describing a configuration of an electronic apparatus according to an embodiment of the present disclosure. Referring to FIG. 1A, the electronic apparatus 100 includes a memory 110, a communication unit 120, and a processor 130.

The electronic apparatus 100 may also be implemented as a server including one or more computers, and also implemented as a smartphone, a tablet, a PC, a desktop PC, etc.

The memory 110 is a component for storing an operating system (OS) for controlling all operations of components of the electronic apparatus 100 and at least one instruction or data related to the component of the electronic apparatus 100.

The memory 110 may include a non-volatile memory such as a ROM, a flash memory, etc., and include a non-volatile memory configured as a DRAM. Further, the memory 110 may also include a hard disk a solid state driver (SSD), etc.

The communication unit 120 is a component for the electronic apparatus 100 to perform communication with various external electronic apparatuses. For example, the electronic apparatus 100 may perform communication with one or more sensor devices, gateways, etc., through the communication unit 110. When the electronic apparatus 100 is a server, the electronic apparatus 100 may perform communication with user terminals of various users, and provide various UIs/UXs related to a service through the user terminal.

The communication unit 120 may include a circuit, a module, a chip, etc. for performing communication with at least one external apparatus by various wired/wireless communication modes. The communication unit 130 may be connected to the external apparatus through various networks.

The network may be a personal area network (PAN), a local area network (LAN), a wide area network (WAN), etc., according to a network area or scale and may be Intranet, Extranet, or Internet according to the openness of the network.

The communication unit 120 may be connected to external apparatuses through various wireless communication modes including long-term evolution (LTE), LTE-Advance (A), $5^{th}$ Generation (G) mobile communication, code division multiple access (CDMA), wideband CDMA (WCDMA), universal mobile telecommunications system (UMTS), Wireless Broadband (WiBro), Global System for Mobile Communications (GSM), Time Division Multiple Access (DMA), WiFi, WiFi Direct, Bluetooth, Bluetooth Low Energy (BLE), near field communication (NFC), Zigbee, LoRa, etc.

Further, the communication unit 120 may also be connected to external apparatuses through wired communication modes such as Ethernet, optical network, universal serial bus (USB), thunderbolt, etc.

Besides, the communication unit 120 may be configured to utilize various communication methods/technologies that will be newly designed in the future.

The processor 130 is a component for controlling the electronic apparatus 100 overall. Specifically, the processor 130 is connected to the memory 110, while the processor 130 may perform operations according to various embodiments of the present disclosure by executing at least one instruction stored in the memory 110.

The processor 130 may include a universal processor such as a CPU, an AP, a digital signal processor (DSP), etc., a graphic dedicated processor such as a GPU, a vision processing unit (VPU), etc., or an artificial intelligence dedicated processor such as an NPU. The artificial intelligence dedicated processor may be designed in a hardware structure specialized for training or using a specific artificial intelligence model.

Figure 1B:
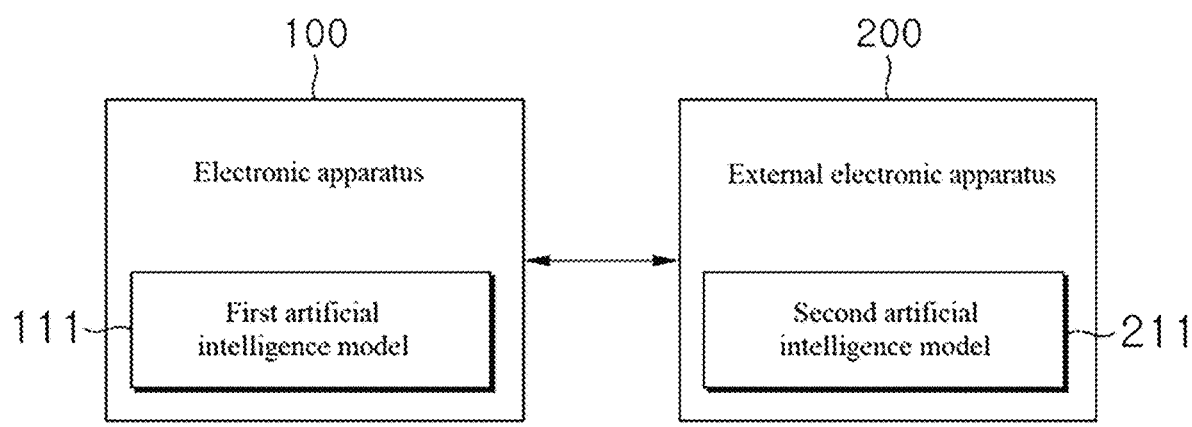
FIG. 1B is a block diagram describing an operation of an electronic apparatus providing an answer by using internal and external artificial intelligence models according to an embodiment of the present disclosure.

FIG. 1B is a block diagram describing an operation of an electronic apparatus providing an answer by using internal and external artificial intelligence models according to an embodiment of the present disclosure.

Referring to FIG. 1B, the electronic apparatus 100 may include a first artificial intelligence model 111 for performing questioning and answering.

The artificial intelligence model 111 may include various engines (e.g., DNN/RNN Engine, NLG, NLU, Dialog Engine, morpheme analysis engine, entity analysis engine, semantic analysis engine, speech act analysis engine, related/similar word analysis engine, user-defined dictionary, etc.). The artificial intelligence model 111 may include a generative model (ex. Generative Pre-trained Transformer) related to conversation, etc. The first artificial intelligence model 111 according to the present disclosure may be referred to as 'K-GPT' and may perform communicate as a concept of a chatbot that carries out a conversation with a user.

The artificial intelligence model 111 may be stored in the memory 110 of the electronic apparatus 100 in the form of data, but it is also possible that at least part of it is implemented as hardware controlled by the processor 130.

Referring to FIG. 1B, the electronic apparatus 100 may communicate with at least one external electronic apparatus 200 through the communication unit 120. The external electronic apparatus 200 may correspond to at least one server or terminal device. For example, the external electronic apparatus 200 may include a second artificial intelligence model 211 corresponding to a GPT model to provide a general-purpose or public comprehensive solution rather than just for a specific organization or institution.

The electronic apparatus 100 may perform communication with the second artificial intelligence model 211 stored in the external electronic apparatus 200 and may perform questioning and answering.

The second artificial intelligence model 211 may also include various engines (e.g., DNN/RNN Engine, NLG, NLU, Dialog Engine, morpheme analysis engine, entity analysis engine, semantic analysis engine, speech act analysis engine, related/similar word analysis engine, user-defined dictionary, etc.) for natural language processing and conversation progress.

As such, the electronic apparatus 100 that may be linked with both the internal first artificial intelligence model 111 and the external second artificial intelligence model 211 may provide an answer for a question of the user through at least one of the first and second artificial intelligence models.

Figure 2:
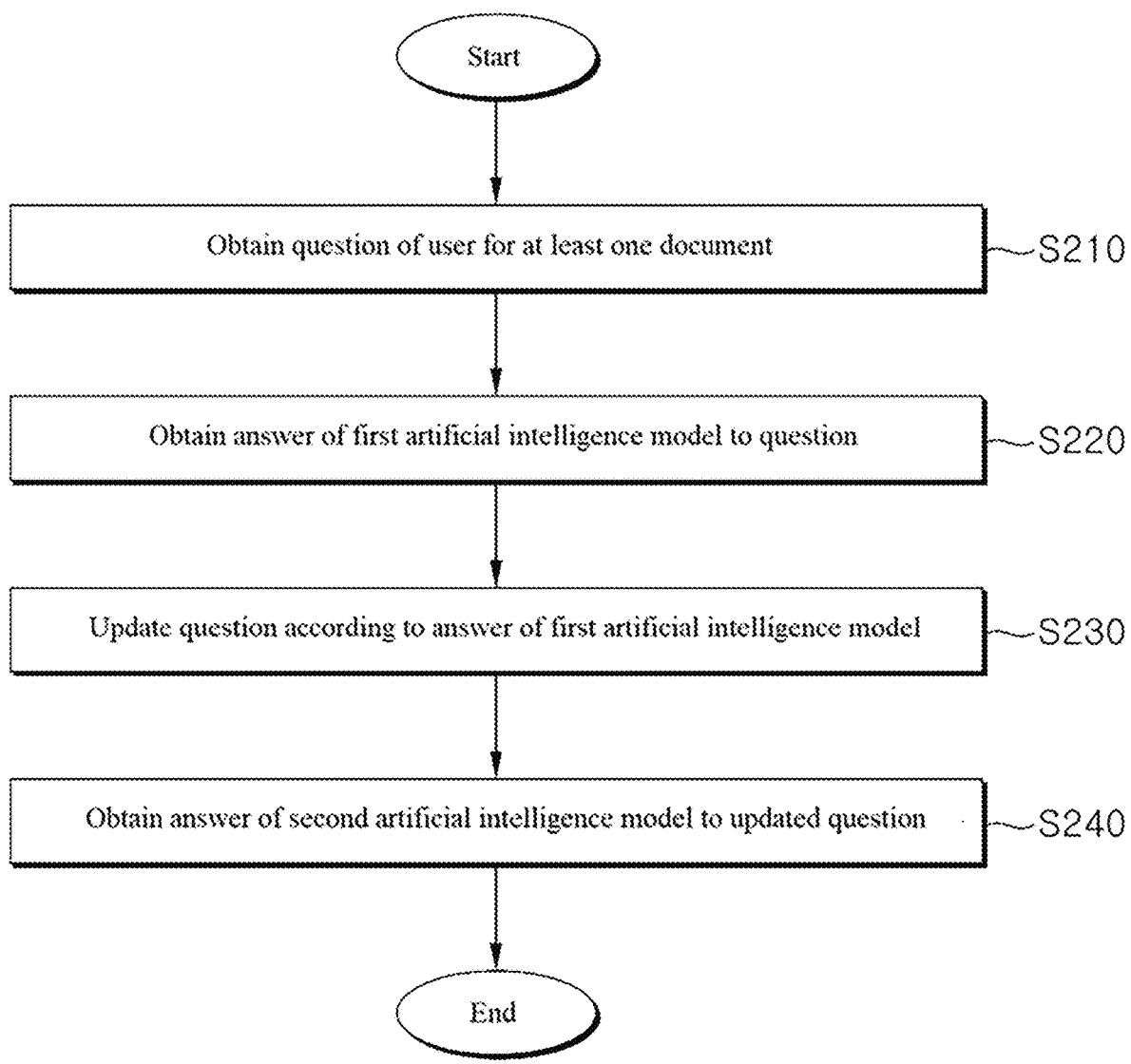
FIG. 2 is a flowchart describing an operation of an electronic apparatus according to an embodiment of the present disclosure.

In this regard, FIG. 2 is a flowchart describing an operation of an electronic apparatus according to an embodiment of the present disclosure.

Referring to FIG. 2, the electronic apparatus 100 may acquire a question of a user for at least one document (S210).

The electronic apparatus 100 may specify a document according to a user input of selecting at least one document pre-stored. Alternatively, the electronic apparatus 100 may provide a user interface (UI) for receiving the document, and at least one document may be selected and uploaded according to the user input on the corresponding UI.

The question may include various queries or requests related to the document. Here, the question may be a simple inquiry, but may include a request for a specific task (e.g., data organization, scheduling, document viewing, document excerpting, summarization, retrieval, etc.).

The question may also be input in the form of voice or text, and may be input in the form of selection of at least one menu (e.g. data organization, schedule organization, and document viewing).

Meanwhile, the electronic apparatus 100 may obtain an answer of a first artificial intelligence model 111 to the question (S220). The first artificial intelligence model 111 may provide the answer in the form of text or voice.

Specifically, the electronic apparatus 100 may classify the category of the document (related to the question) based on the semantic analysis of the first artificial intelligence model 111. At this time, the degree of association between each keyword and the category may be defined based on a vector into which each keyword included in the document is converted, and the category of the document may be selected based on the degree of association between each keyword and the category.

The category may be set variously depending on the purpose or function of the electronic apparatus 100 or the first artificial intelligence model 111. Specifically, the category may be set according to the nature of the organization, institution, etc. for which the electronic apparatus 100 or the first artificial intelligence model 111 is used. For example, the category may be classified into various categories such as public documents, private documents, reports, articles, theses, books, general documents, and security documents.

Alternatively, the category may also be classified in detail within a specific field (e.g., public sector). For example, the category may include, but are not limited to, taxes, education administration, public safety, health care, real estate, road traffic, monitoring of vulnerable groups, industrial employment, etc.

The electronic apparatus 100 may store documents in a knowledge base linked with the electronic apparatus 100 based on the classified categories. That is, documents matching each category may be stored. The knowledge base may also be included in the electronic apparatus 100, or may be included in at least one database communicatively connected to the electronic apparatus 100.

As an embodiment, the electronic apparatus 100 may obtain an answer of the first artificial intelligence model 111 to the question of the user based on at least one target document included in the same category as the document related to the input question. For example, when the question is input along with a document corresponding to an educational administration category, the electronic apparatus 100 may provide the answer using at least one target document related to the question among a plurality of documents belonging to the educational administration category.

Specifically, the electronic apparatus 100 may identify at least one keyword included in the question of the user and identify a plurality of documents included in the same category as the document in the knowledge base. Here, the electronic apparatus 100 may select at least one target document related to the identified keyword among the plurality of documents, and obtain the answer of the first artificial intelligence model 111 for the question of the user based on the selected target document.

Meanwhile, the electronic apparatus 100 may also provide the answer of the first artificial intelligence model 111 as a final answer, but provide the answer by utilizing both the first artificial intelligence model 111 and the second artificial intelligence model 211.

Specifically, the electronic apparatus 100 may update the question based on the answer of the first artificial intelligence model 111 for the question (S230). In addition, the electronic apparatus 100 may obtain the answer of the second artificial intelligence model 211 based on the updated question (S240).

Figure 3:
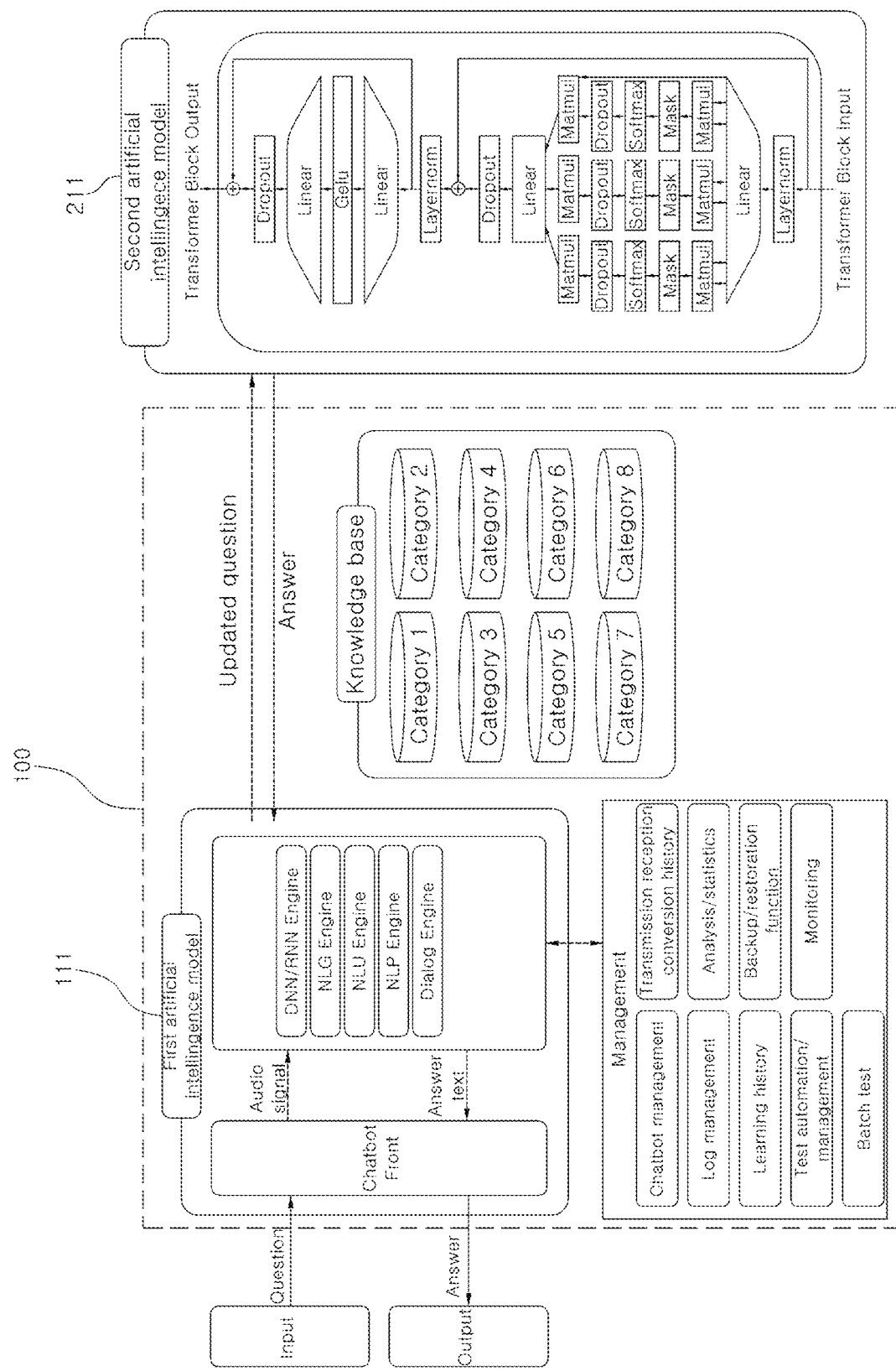
FIG. 3 is a block diagram describing a functional configuration of an electronic apparatus using an artificial intelligence model stored therein and an external artificial intelligence model according to an embodiment of the present disclosure.

In this regard, FIG. 3 is a block diagram describing a functional configuration of an electronic apparatus using an artificial intelligence model stored therein and an external artificial intelligence model according to an embodiment of the present disclosure.

Referring to FIG. 3, the electronic apparatus 100 may include various engines constituting the first artificial intelligence model 111. Specifically, the first artificial intelligence model 111 may include, but is not limited to, a DNN/RNN engine, a natural language generation engine (NLG), a natural language understanding engine (NLU), a natural language processing engine (NLP), a conversation engine, etc.

Referring to FIG. 3, the electronic apparatus 100 may include various engines/modules for management of the first artificial intelligence model 111. Specifically, the electronic apparatus 100 may perform functions including chatbot management for managing a chatbot specified as the first artificial intelligence model 111, log management, learning history management, transmission/reception conversation history management, analysis/statistics/report generation, and backup/restore, test management, monitoring, batch testing, etc.

The electronic apparatus 100 may be linked to a knowledge base in which documents are stored for various categories (e.g., categories 1 to 8), respectively, and the knowledge base may be utilized during a learning process and/or answer generation process of the first artificial intelligence model 111.

In particular, the first artificial intelligence model 111 is trained based on documents uploaded according to the user input and conversation contents with the user to answer various questions or perform the task. Specifically, the electronic apparatus 100 may train the respective engines constituting the first artificial intelligence model 111 based on various uploaded documents.

Referring to FIG. 3, the electronic apparatus 100 may obtain the question of the user through a UI which is provided in the form of communication with the chatbot. For example, when the question is input as a voice (audio signal), the first artificial intelligence model 111 may generate the answer by performing natural language understanding for voice-converted text.

In this case, the electronic apparatus 100 may further update the question of the user based on the answer generated by the first artificial intelligence model 111. For example, a case in which a question "How should the budget be distributed to each part of educational administration?" is obtained is assumed. In this case, the first artificial intelligence model 111 may collect related information based on documents within a category (e.g., educational administration) in the knowledge base. As a result, the first artificial intelligence model 111 may provide an answer such as "Educational administration is divided into national and local positions and the total budget is OOO won" based on the contents of the document in the knowledge base. Further, the first artificial intelligence model 111 may provide information on a distribution history for a budget for each past year as an additional answer.

At this time, the electronic apparatus 100 may update the question by adding the answer of the first artificial intelligence model 111 to the existing question, and transmits the updated question to the external electronic apparatus 200 to obtain the answer of the second artificial intelligence model 111.

Meanwhile, in the process of updating the question, the electronic apparatus 100 may replace personal information or sensitive information included in at least one of the question of the user and the answer of the first artificial intelligence model 111 with example information. The personal information refers to a variety of information related to an individual's identification information, password, or privacy, and may include, but is not limited to, name, social security number, work history, medical history, etc., for example. The sensitive information may refer to information that is confidential or should not be disclosed within an organization or institution in which the electronic apparatus 100 operates, and may correspond to confidential information requiring security, undisclosed information, and information disclosed only to specific people or under specific circumstances.

Meanwhile, a security level may be set on at least one document related to the question. For example, it is assumed that a security level of a predetermined level or higher is set for at least one of the document that is the subject of the user's question and/or the document used in the answer process of the first artificial intelligence model 111. In this case, the electronic apparatus 100 may identify security information included in the answer of the first artificial intelligence model, and in the process of updating the question, the electronic apparatus 100 may replace the security information included in at least one of the user's question and the answer of the first artificial intelligence model 111 with example information.

As a result, a situation where the personal information or security information is leaked to an external electronic apparatus 211 that does not handle only internal information but has a general or public purpose may be prevented.

Meanwhile, the electronic device 100 according to an embodiment of the present disclosure may selectively utilize the first artificial intelligence model 111 and the second artificial intelligence model 211 according to the type of task requested according to the user's question.

Figure 4:
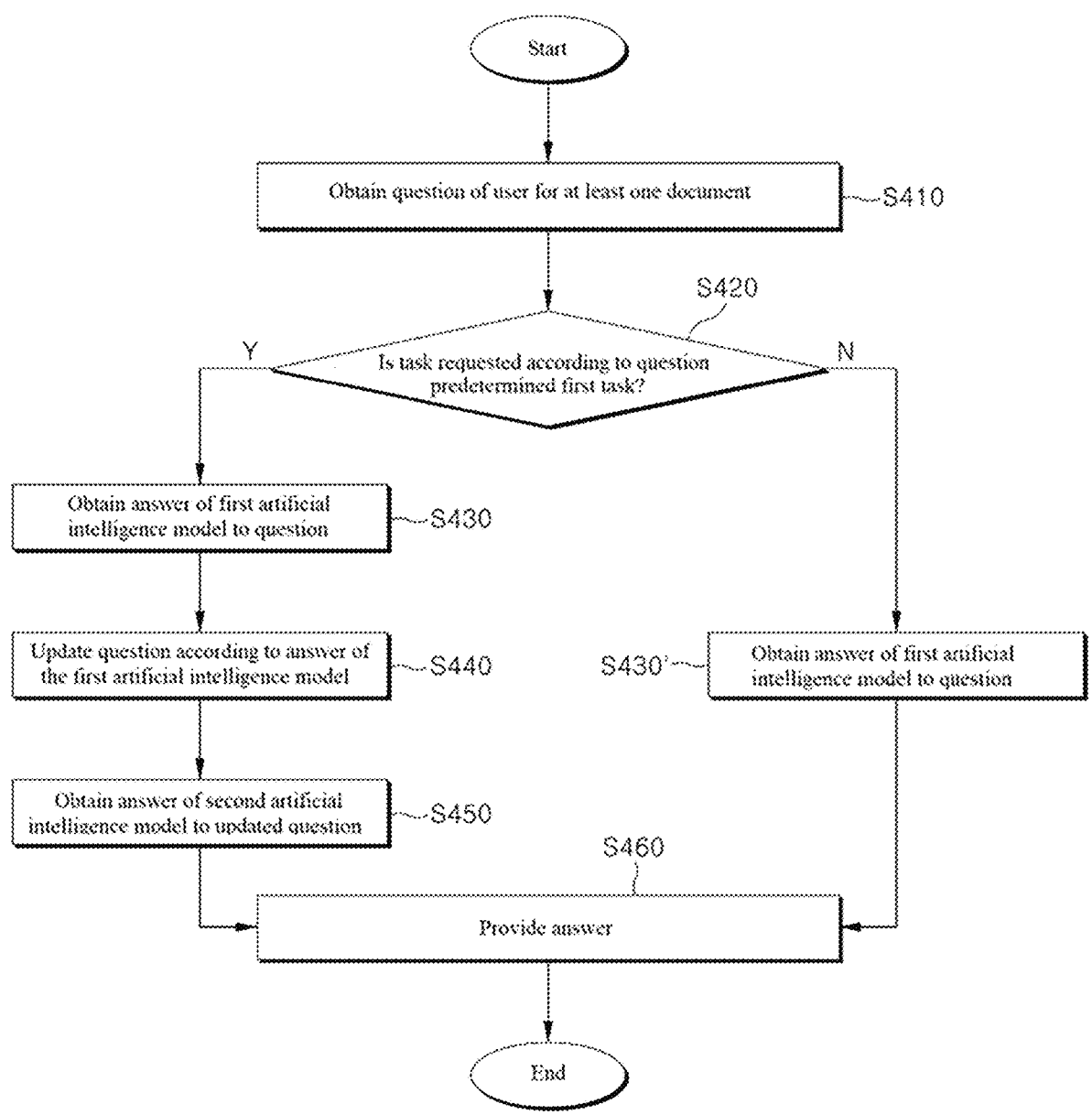
FIG. 4 is an algorithm describing an operation of selectively utilizing an artificial intelligence model according to the type of task requested by the electronic apparatus according to an embodiment of the present disclosure.

In this regard, FIG. 4 is an algorithm describing an operation of selectively utilizing an artificial intelligence model according to the type of task requested by the electronic apparatus according to an embodiment of the present disclosure.

Referring to FIG. 4, the electronic apparatus 100 may obtain a question of a user for at least one document (S410), and identify the type of task requested according to the question (S420).

The type of task may be divided into, for example, a first task that requires both the first artificial intelligence model 111 and the second artificial intelligence model 211, and a second task which may be solved by the first artificial intelligence model 111 alone. Here, the division between the first task and the second task may be established in various modes. For example, the first task may include external search, an answer to expert knowledge, an answer to common sense, coding, data organization and document creation, etc., and the second task may include internal search, an answer to internal knowledge, schedule organization, etc., but are not limited thereto.

When the requested task is included in a predetermined first task (S420-Y), the electronic apparatus 100 may obtain an answer of the first artificial intelligence model 111 to the question (S430). At this time, the electronic apparatus 100 may update the question according to the answer of the first artificial intelligence model 111 (S440), and obtain an answer of the second artificial intelligence model 211 to the updated question (S450) and finally provide the answer (S460).

On the other hand, when the requested task is not included in the predetermined first task (S420-N), the electronic apparatus 100 may obtain the answer of the first artificial intelligence model 111 to the question (S430'), and immediately provide the obtained answer as the final answer (460).

Meanwhile, as an embodiment, as a result of the identified task being included in the second task, the answer of the first artificial intelligence model is provided as a first answer (e.g., S430'→S460), and then a user input requesting an additional answer may be received. For example, an additional answer may be requested because the answer is insufficient in content or does not fit the question.

In this case, the electronic apparatus 100 may perform the above-described processes S430 to S460. Specifically, the electronic apparatus 100 may update the question based on the answer of the first artificial intelligence model, obtain the answer of the second artificial intelligence model based on the updated question, and provide the obtained answer as a second answer.

When the second answer is provided as such, the electronic apparatus 100 may identify whether there is additional information included in the second answer, but not included in the first answer. In other words, although the first artificial intelligence model is not derived, it is confirmed whether additional information provided by the second artificial intelligence model of the external electronic apparatus exists.

Here, when the additional information exists, the electronic apparatus 100 may update the first task and the second task so that the previously identified task is included in the first task rather than the second task. When the same task is requested thereafter, the task is identified as the first task, so the electronic apparatus 100 obtains the answer through steps S430 to S450 rather than step S430'. As a result, more abundant information desired by the user may be provided for the task in the future.

On the other hand, when no additional information exists, the electronic apparatus 100 may train the first artificial intelligence model based on the second answer. Specifically, the electronic apparatus 100 may obtain a user input regarding whether the user who confirms the second answer is satisfied, and when the user's evaluation that the user is satisfied with the second answer or that the second answer is more appropriate than the first answer is obtained, the electronic apparatus 100 may train the first artificial intelligence model based on the second question. As a result, the first artificial intelligence model may be trained to provide a more appropriate answer even if a request related to the same task is received in the future.

As an additional embodiment, when the second answer is provided as described above, the electronic apparatus 100 may identify whether there is a conflict between the second answer and the first answer. In other words, it is confirmed whether the answer of the first artificial intelligence model and the answer of the second artificial intelligence model do not logically match or conflict with each other. To this end, the electronic apparatus 100 may semantically analyze the text constituting the first and second answers to identify subjects, objects, verbs, negatives, etc., and based on this, identify whether there is the conflict between the answers.

For example, if the same subject and object are included, but the first answer includes the positive form of the verb and the second answer includes the negative form of the same verb, the conflict may be identified.

At this time, the electronic apparatus 100 may provide a message indicating that the second answer and the first answer conflict with each other, and receive a user input for selecting an appropriate answer between the first answer and the second answer.

Here, when the first answer is selected, the electronic apparatus 100 may identify a document that matches the text of the first answer among the documents stored in the knowledge base, that is, a document which becomes a basis that the first artificial intelligence model 111 provides the first answer. At this time, the electronic apparatus 100 may inquire, to the user, whether to disclose the identified document.

When a user input for disclosing the identified document to the outside is received, the electronic apparatus 100 may transmit the document to the external electronic apparatus in which the second artificial intelligence model 211 is stored.

On the other hand, when a user input for not disclosing the identified document to the outside is received, the electronic apparatus 100 may change and set, to the second task, at least one first task having an association degree of a predetermined level with the identified document among the first tasks. The first task having a high association degree with the document that may not be disclosed is changed and set to the second task, thereby preventing leakage of confidential information to external electronic apparatus and constructing an answer providing system optimized only for the user.

Here, the association degree may refer to a degree at which the document is associated with the task, and the higher the frequency with which the document is used in the task, the greater the association degree may be calculated. For example, in the process of providing answers to respective first tasks requested according to questions of one or more users, the electronic apparatus 100 may record frequencies at which information included in the respective documents are used, and an association degree of the respective documents with the respective first tasks may be calculated according to the recorded frequencies.

Meanwhile, when the second answer is selected as the appropriate answer, the electronic apparatus 100 may similarly identify a document that matches the text of the first answer among the documents stored in the knowledge base, that is, a document which becomes a basis that the first artificial intelligence model 111 provides the first answer. At this time, the electronic apparatus 100 may modify at least one text related to the first answer in the identified document according to the second answer, or delete at least one text related to the first answer.

Figure 5A:
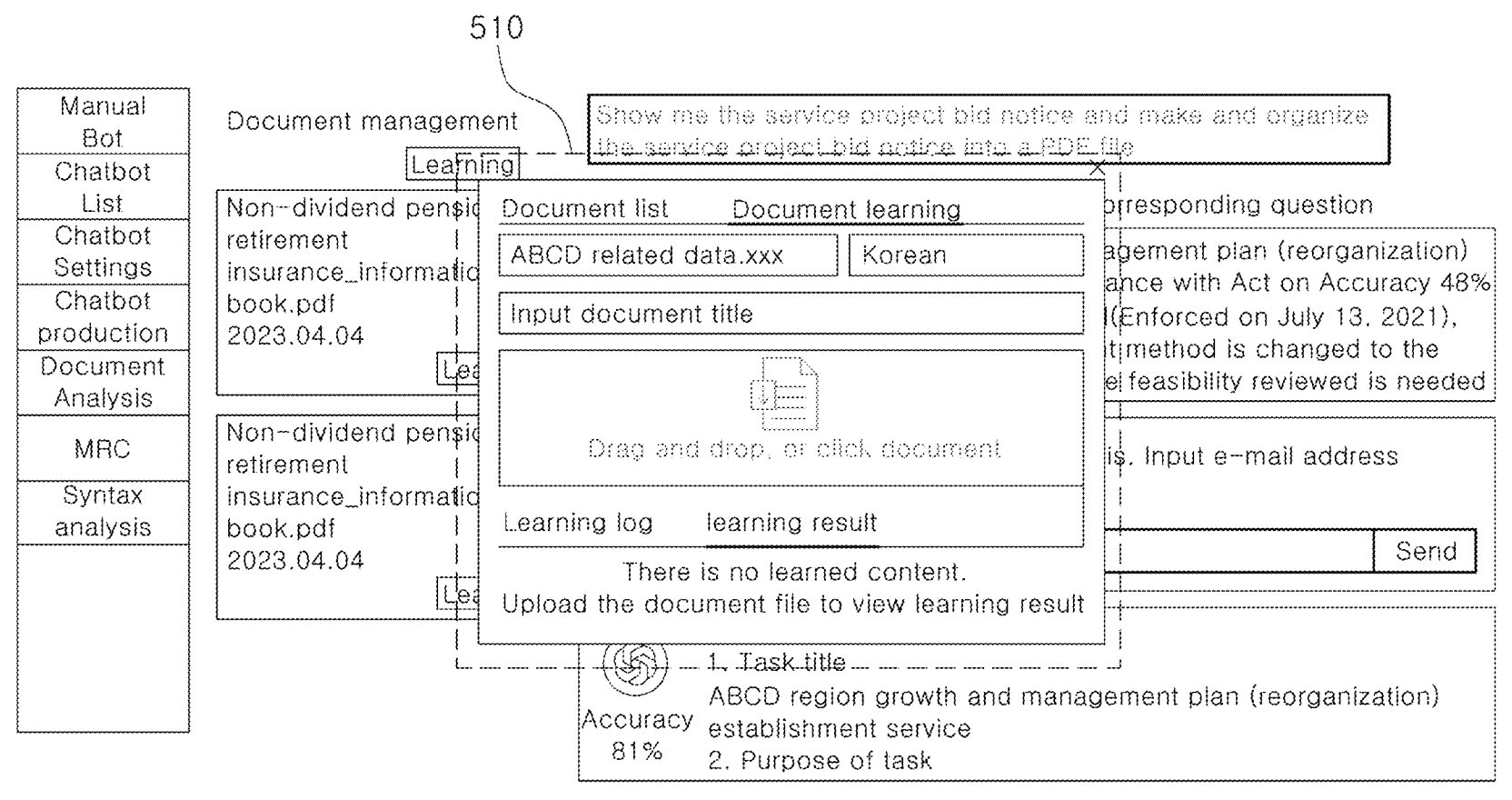
Figure 5B:
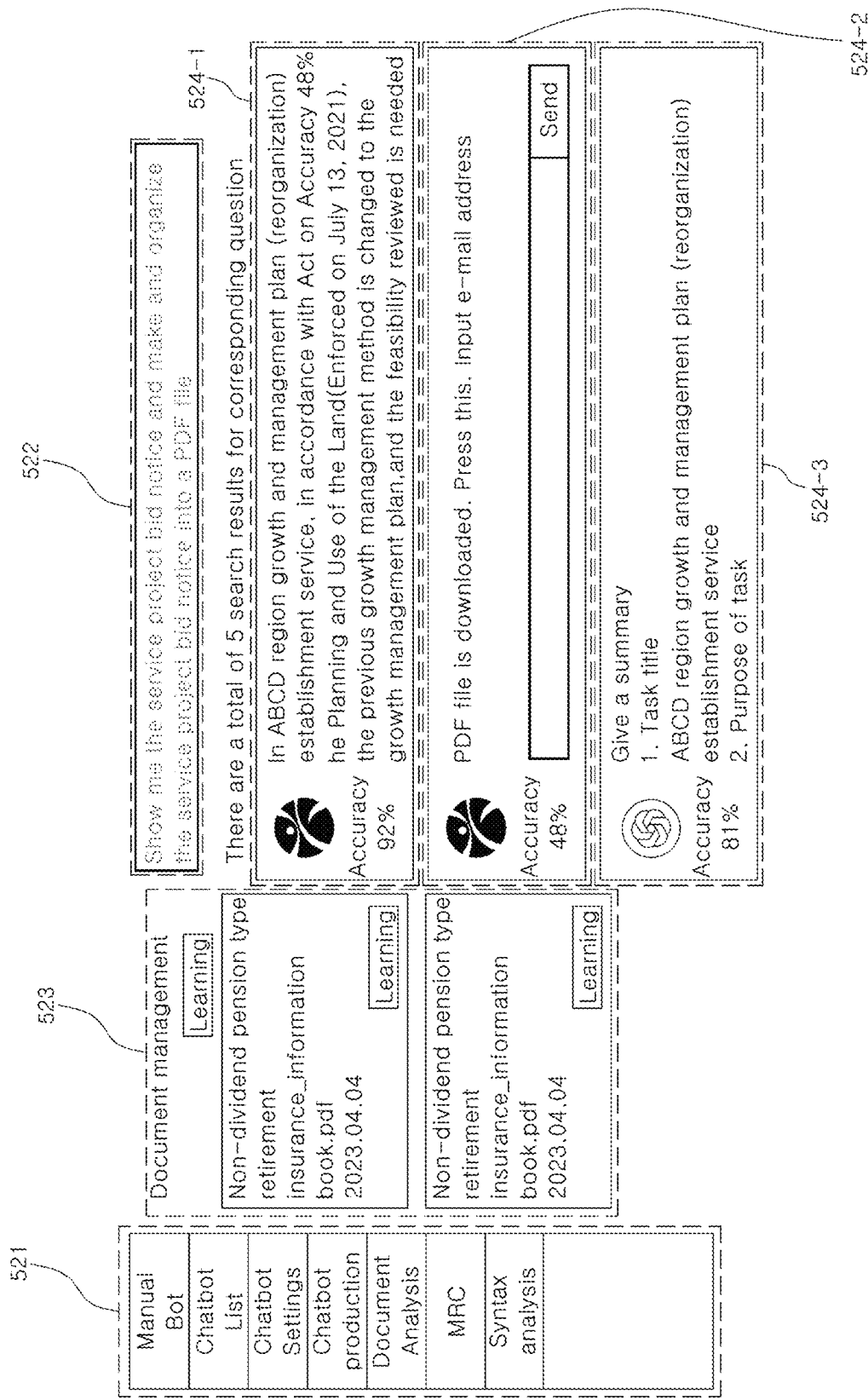

Meanwhile, FIGS. 5A and 5B are diagrams showing a state in which the electronic apparatus receives a document jointly with a question of a user and provides one or more answers for the question.

Screens shown in FIGS. 5A and 5B, the electronic apparatus 100 implemented as the server may be a UI that is linked with a user terminal (e.g., a smartphone, a tablet PC, a desktop PC, a laptop PC, etc.) through at least one webpage or application, and provided through the user terminal. Alternatively, the screens illustrated in FIGS. 5A and 5B may also be UIs displayed on a display of the electronic apparatus 100.

Referring to FIG. 5A, the electronic apparatus 100 may obtain at least one document according to a user input received through a UI 510.

For example, when the electronic apparatus 100 is the server, the electronic apparatus 100 may provide the UI 510 through the user terminal, and when a document (e.g., "ABCD related data") stored in the user terminal is selected on the UI 510, the electronic apparatus 100 may receive the document from the user terminal. However, it is, of course, possible for the electronic apparatus 100 to be implemented as the user terminal itself.

In this case, the electronic apparatus 100 may train the first artificial intelligence model 111 based on the selected document, and obtain the question of the user related to the document.

In this regard, referring to FIG. 5B, the electronic apparatus 100 may provide a menu UI 521, a question UI 522, a document management UI 523, etc.

The menu UI 521 includes various menu items which the electronic apparatus 100 may provide through the first artificial intelligence model 111, such as a chatbot list, a chatbot setting, chatbot production, document analysis, MRC, syntax analysis, etc.

The chatbot list is a menu item for providing a list of one or more chatbots provided through the electronic apparatus 100. In this regard, the electronic apparatus 100 may include each of a plurality of first artificial intelligence models classified according to the function or purpose, and the respective first artificial intelligence models are provided in different chatbot forms. In this case, the respective first artificial intelligence models may be trained in link with knowledge bases of different categories, and a list of a plurality of chatbots is provided, so at least one chatbot may be selected as a target for communication. Alternatively, it is also possible that the plurality of chatbots provide answers, respectively with respect to the same question.

The chatbot setting is a menu item for supporting various settings related to the chatbot. For example, a task performed by each chatbot, whether each chatbot is activated, etc., may be set, but the chatbot setting is not limited thereto.

Chatbot production is a menu item for creating at least one chatbot. For example, at least one document for newly creating and training at least one chatbot may be input, and a chatbot trained for a new category may be automatically created on the electronic apparatus 100 based on the input document.

Document analysis is a menu item for performing analysis on the input document. Analysis can cover a variety of contents, including generating statistical information, extracting keywords, summarizing, and analyzing reliability.

Machine reading comprehension (MRC) corresponds to a menu item for natural language processing and machine learning. Specifically, information related to utilizing in addition to learning each engine (e.g., context understanding, conversion creation, questioning and answering, etc.) constituting the first artificial intelligence model 111 may be provided.

Syntax analysis is a menu item for analyzing the text that constitutes a document for each syntax. For example, a UI may be provided where the text is divided for each syntax, and main keywords or related additional information may be provided for each division, but the present disclosure is not limited thereto.

A questioning UI 522 is a UI for obtaining a question of a user. The question of the user may be input through the questioning UI 522, and the input question may be displayed.

A document management UI 523 is a UI for displaying a document related to the question. The document management UI 523 may be provided to include at least one document utilized in a process of preparing the answer to the question by the first artificial intelligence model 111 in addition to a document which becomes a target of the question.

Referring to FIG. 5B, it is assumed a situation where a question "Show me the service project bid notice and make and organize the service project bid notice into a PDF file"

is input through the questioning UI 522. In this case, the electronic apparatus 100 may provide a plurality of answers 524-1, 2, and 3 through a plurality of first artificial intelligence models, respectively. In this case, respective first artificial intelligence models may provide the answer by performing different tasks (e.g., information viewing, file creation and provision, and summary).

At this time, the documents used in the process of generating the answers by the respective first artificial intelligence models may be displayed on the document management UI 523.

Figure 6:
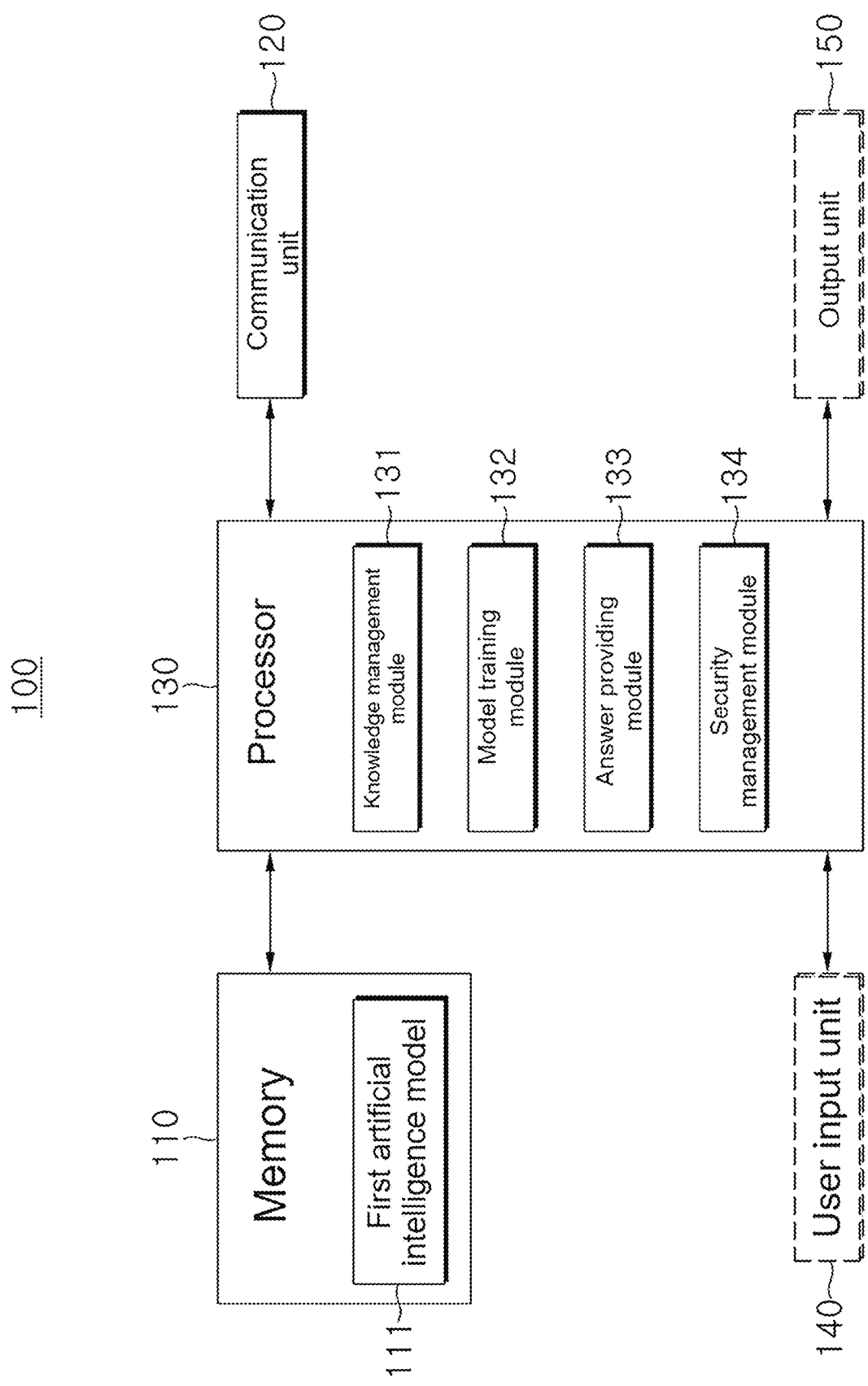
FIG. 6 is a block diagram describing a configuration of an electronic apparatus according to various embodiments of the present disclosure.

Meanwhile, FIG. 6 is a block diagram describing a configuration of an electronic apparatus according to various embodiments of the present disclosure.

Referring to FIG. 6, the processor 130 of the electronic apparatus 100 may include various functional modules including a knowledge management module 131, a model training module 132, an answer providing module 133, a security management module 134, etc. Each module may be implemented as software and/or hardware.

The knowledge management module 131 is a module for managing various documents by category to support a training process of the first artificial intelligence model 111, an answer creation process, etc.

The model training module 132 is a module for training the first artificial intelligence model 111 based on the category-specific document stored in the knowledge base.

The answer providing module 133 is a module for providing the answer through natural language understanding, natural language processing, etc., of the first artificial intelligence model 111. The answer providing module 133 may also provide various information corresponding to the answer based on at least one document related to the question of the user, and in this case, search or analysis based on the natural language understanding of the artificial intelligence model 111 may be utilized.

The security management module 134 is a module for preventing a security document or security information, personal information, etc., for which the security level is set. The security management module 134 may manage the security level of each document included in the knowledge base, and the security level may be set for each document according to the user input. Alternatively, the security management module 134 may also automatically set the security level of each document based on the keyword included in each document. At this time, the security management module 134 may identify whether each keyword corresponds to personal information or sensitive information based on semantic analysis of the first artificial intelligence model 111. Here, the more keywords corresponding to personal information or sensitive information, the higher the security level of the document may be set.

Referring to FIG. 6, the electronic apparatus 100 may further include the user input unit 140, the output unit 150, etc., in addition to the memory 110, the communication unit 120, and the processor 130.

The user input unit 140 is a component for receiving various instructions or information from the user. The user input unit 140 may be implemented as at least one button, touch pad, touch screen, microphone, camera, sensor, etc. Further, the electronic apparatus 100 may also be connected to various user input devices (e.g., keyboard, mouse, etc.) including at least one keypad, button, motion sensor, etc.

The output unit 150 as a component for outputting various information may include a display, a speaker, and an earphone/headset terminal. As an embodiment, the UI screens in FIGS. 5A and 5B may be provided through the display of the output unit 150.

Meanwhile, various embodiments described above may be implemented by combining two or more embodiments as long as the embodiments do not conflict or contradict each other.

Meanwhile, various embodiments described herein may be implemented in a computer-readable recording medium or a recording medium readable by a device similar to the computer by using, for example, software, hardware, or a combination thereof.

According to hardware implementation, the embodiment described in the present disclosure may be implemented by using at least one of the application specific integrated circuits (ASICs), the digital signal processors (DSPs), the digital signal processing devices (DSPDs), the programmable logic devices (PLDs), the field programmable gate arrays (FPGAs), the processors, the controllers, the microcontrollers, the microprocessors, and the electric units for performing other functions.

In some cases, the embodiments described in the specification may be implemented by the processor itself. According to software implementation, embodiments such as a procedure and a function described in the specification may be implemented by separate software modules. Each of the software modules may perform one or more functions and operations described in the specification.

Meanwhile, computer instructions or computer programs for performing processing operations in electronic apparatuses such as robots according to various embodiments of the present disclosure described above may be stored in a non-transitory computer-readable medium. The computer instructions or computer programs stored in such non-transitory computer-readable medium, when executed by a processor of a specific device, cause the specific device to perform processing operations in the electronic apparatus according to the various embodiments described above.

The non-transitory computer readable medium is not a medium that stores data therein for a while, such as a register, a cache, a memory, or the like, but means a medium that semi-permanently stores data therein and is readable by a device. Specific examples of the non-transitory computer-readable medium may include CD, DVD, hard disk, Blu-ray disk, USB, memory card, ROM, etc.

While the embodiments of the present disclosure have been illustrated and described above, the present disclosure is not limited to the aforementioned specific embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present disclosure.

What is claimed is:

1. An electronic apparatus comprising:
a memory including a first artificial intelligence model for performing questioning and answering;
a communication unit for performing communication with an external electronic apparatus including a second artificial intelligence model for performing questioning and answering; and
a processor providing an answer to a question of a user through at least one of the first artificial intelligence model and the second artificial intelligence model, wherein the processor obtains a question of the user for at least one document and an answer of the first artificial intelligence model to the question, updates the question based on the answer of the first artificial intelligence model, and obtains an answer of the second artificial intelligence model based on the updated question, wherein the processor classifies a category of the document based on semantic analysis of the first artificial intelligence model for the document, and stores the document in a knowledge base linked with the electronic apparatus based on the classified category, and wherein the processor obtains the answer of the first artificial intelligence model to the question of the user based on at least one target document included in the same category as the document in the knowledge base.

2. The electronic apparatus of claim 1, wherein the processor identifies at least one keyword included in the question of the user, identifies a plurality of documents included in the same category as the document in the knowledge base, selects at least one target document related to the keyword among the plurality of documents, and obtains the answer of the first artificial intelligence model to the question of the user based on the selected target document.

3. The electronic apparatus of claim 1, wherein the processor replaces personal information included in at least one of the question of the user and the answer of the first artificial intelligence model with example information in a process of updating the question.

4. The electronic apparatus of claim 1, wherein the processor identifies, when a security level of a predetermined degree or more is set in at least one of a first document related to the question and a second document related to the answer of the first artificial intelligence model, security information included in the answer of the first artificial intelligence model, and replaces the security information included in at least one of the question of the user and the first artificial intelligence model in the process of updating the question.

5. The electronic apparatus of claim 1, wherein the artificial intelligence model includes at least one of an engine including a recurrent neural network (RNN) model, a natural language generation engine, a natural language processing engine, a natural language understanding engine, and a conversation engine, and the processor trains at least one engine constituting the artificial intelligence model based on the document.

6. The electronic apparatus of claim 1, wherein the processor identifies at least one task requested according to the question of the user, when the identified task is included in a predetermined first task, obtains the answer of the first artificial intelligence model to the question, updates the question based on the answer of the first artificial intelligence model, and obtains and provides the answer based on the updated question, and obtains and provides the answer of the first artificial intelligence model to the question when the identified task is included in a predetermined second task.

7. The electronic apparatus of claim 6, wherein the processor updates, when a user input for requesting an additional answer is received after the answer of the first artificial intelligence model is provided as a first answer as a result that the identified task is included in the second task, the question based on the answer of the first artificial intelligence model, and obtains the answer of the second artificial intelligence model based on the updated question and provides the obtained answer as a second answer, identifies whether additional information included in the second answer, but not included in the first answer exists when the second answer is provided, updates the first task and the second task and the second task so that the identified task is included in the first task other than the second task when the additional information exists, and trains the first artificial intelligence model based on the second answer when the additional information does not exist.

8. A control method of an electronic apparatus including a first artificial intelligence model for performing questioning and answering, comprising:

obtaining, by the electronic apparatus, a question of the user for at least one document, and an answer of the artificial intelligence model to the question;

updating, by the electronic apparatus, the question based on the answer of the first artificial intelligence model; and obtaining an answer of a second artificial intelligence model stored in an external electronic apparatus and performing the questioning and answering based on the updated question, wherein the control method of an electronic apparatus includes classifying a category of the document based on semantic analysis of the first artificial intelligence model for the document; and storing the document in a knowledge base linked with the electronic apparatus based on the classified category, and in the obtaining of the answer of the first artificial intelligence model, the answer of the first artificial intelligence model to the question of the user is obtained based on at least one target document included in the same category as the document in the knowledge base.

* * * * *